Nov. 2, 1926. 1,605,062
J. H. POWRIE
ART OF COLOR PHOTOGRAPHY
Filed March 16, 1920    8 Sheets-Sheet 2

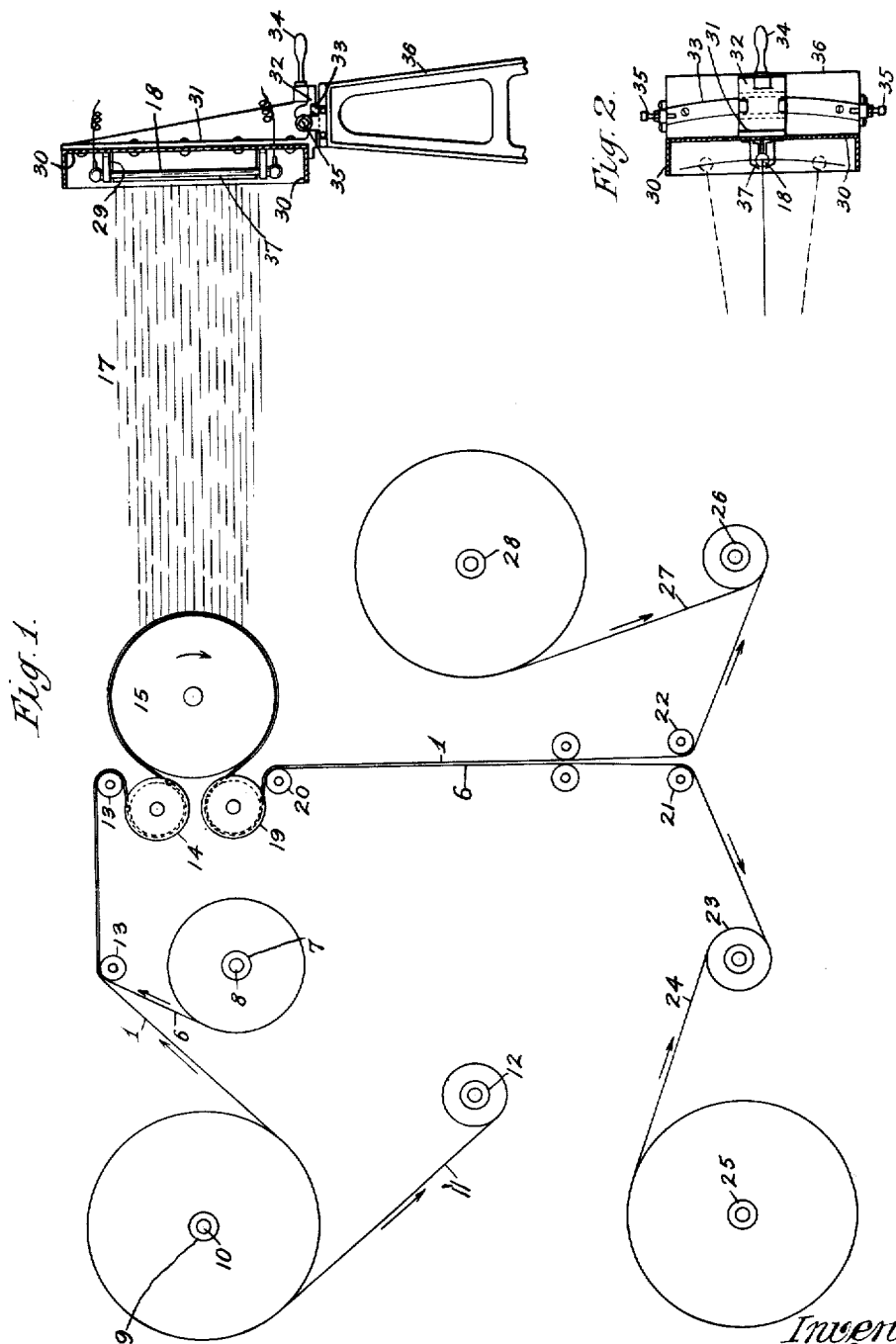

Inventor:
John H Powrie
by his Attys:
Phillips, Sawyer, Rice & Kennedy

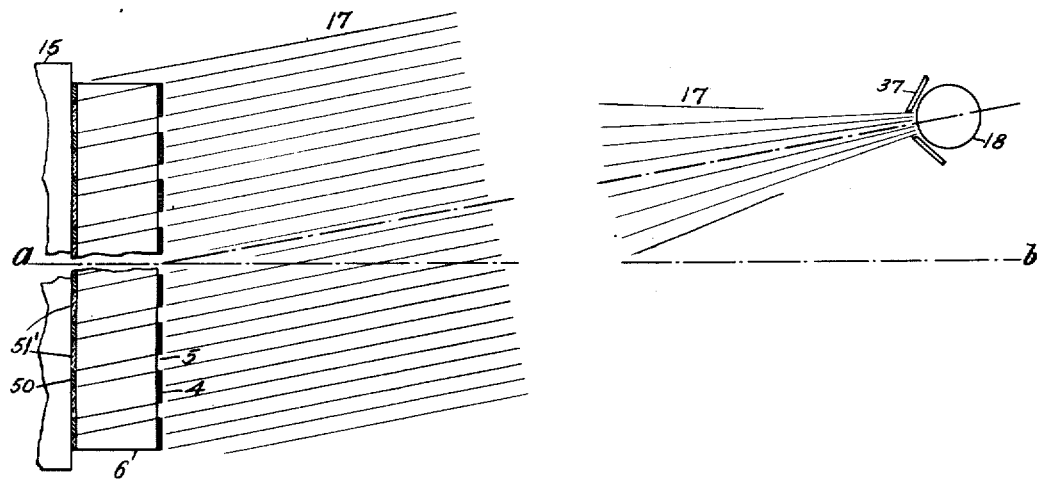
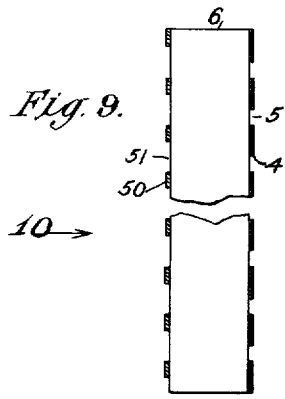
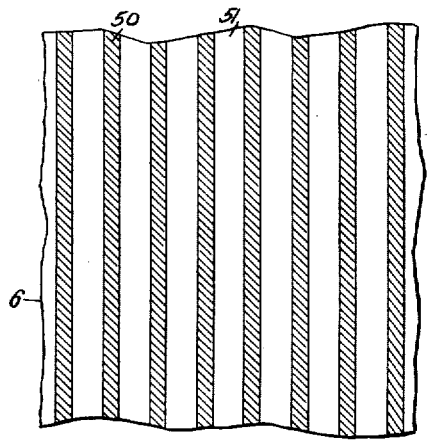

Nov. 2, 1926.  
J. H. POWRIE  
ART OF COLOR PHOTOGRAPHY  
Filed March 16, 1920  
1,605,062  
8 Sheets-Sheet 4
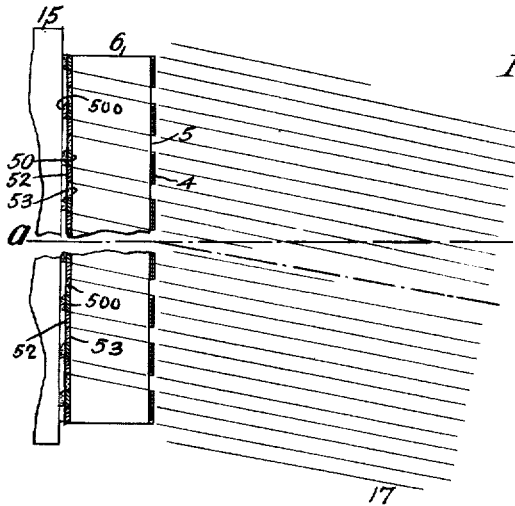
Fig. 11.
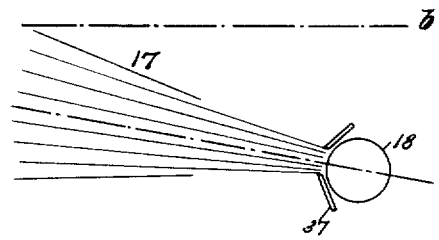
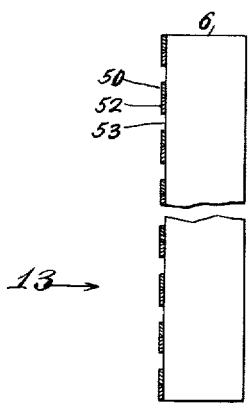
Fig. 12.
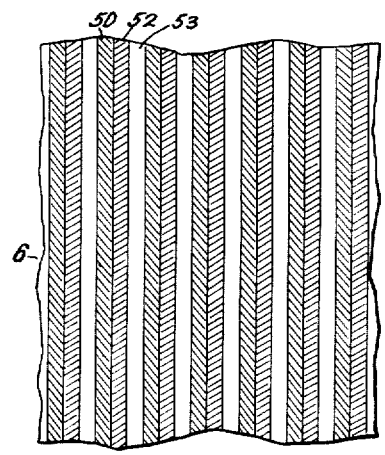
Fig. 13.
Inventor:  
John H Powrie  
by his Attys:  
Philip, Sawyer, Rice Kennedy Nov. 2, 1926.    J. H. POWRIE    1,605,062
ART OF COLOR PHOTOGRAPHY
Filed March 16, 1920    8 Sheets-Sheet 5

Nov. 2, 1926. 1,605,062
J. H. POWRIE
ART OF COLOR PHOTOGRAPHY
Filed March 16, 1920  8 Sheets-Sheet 6

Inventor:
John H Powrie
by his Attys:
Phillips, Sawyer, Rice & Kennedy

Nov. 2, 1926.
J. H. POWRIE
ART OF COLOR PHOTOGRAPHY
1,605,062
Filed March 16, 1920
8 Sheets-Sheet 7
Fig. 26.
Fig. 22.
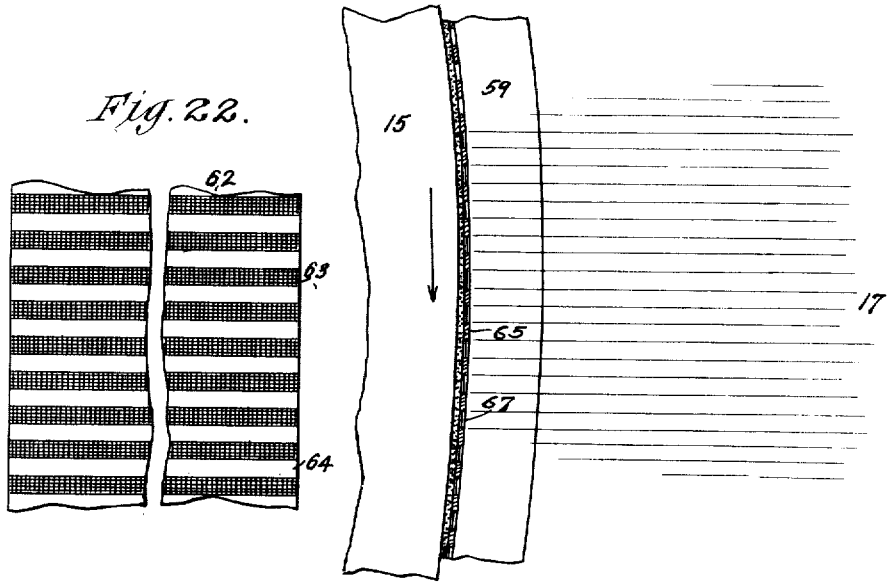
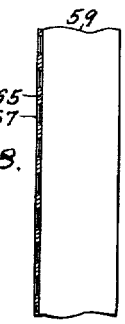
Fig. 28.
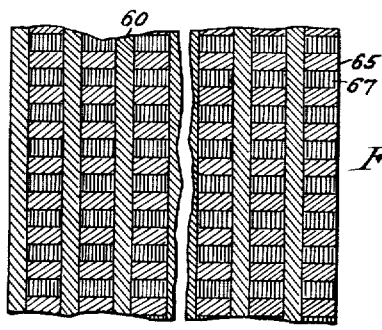
Fig. 27.
Fig. 29.
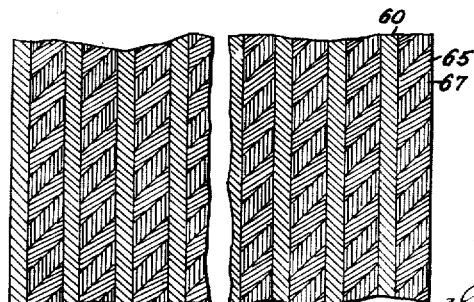
Inventor:
John H Powrie
by his Attys.
Philip Sawyer Rice Kennedy Nov. 2, 1926.

J. H. POWRIE 1,605,062

ART OF COLOR PHOTOGRAPHY

Filed March 16, 1920

Patented Nov. 2, 1926.

1,605,062

UNITED STATES PATENT OFFICE.

JOHN H. POWRIE, OF NEW YORK, N. Y.

ART OF COLOR PHOTOGRAPHY.

Application filed March 16, 1920. Serial No. 366,198.

This invention relates to certain improvements in color photography and particularly to improvements in multicolor screen films of long length which are suitable for the production of pictures in natural colors and to methods of producing such films and making positives therefrom.

Various attempts have been made to produce a multi-color film of long length such as those suitable for motion pictures in natural colors, or for roll films such as those used in hand cameras.

These attempts may be roughly divided into two classes, by the first of which it is proposed to employ a multicolor screen, and in the second of which the color records are produced by making a monochrome negative through different colored filters placed between the film and the object, to produce a record for each color; then printing a monochrome positive from this negative and projecting the positive through similar colored filters onto the projection screen. The separate color records have been produced by (a) taking the records through the filters successively one after the other; (b) simultaneously through the different filters on different portions of the film, either through separate lenses or through one lens, in the latter case the separate images being produced by reflecting mirrors or refracting prisms. These methods are complicated and unsatisfactory, and further require special projecting machines for obtaining the correct optical mixture of light, and for these reasons most of the attempts to produce color records by these methods have been confined to the use of two colors.

The methods of the first class are preferable, because three records may be produced in the so-called primary colors, these records permitting the final production of an infinite number of colors. The attempts, however, to produce pictures of the first class have been practically and commercially unsuccessful. For instance, it has been proposed to produce a block made up of separate sheets of transparent material, such as celluloid, which may be of alternate sheets of red, blue and green color, these sheets being pressed together under heavy pressure and then a ribbon cut from the block. This proposal was unsatisfactory as it has been impractical to make the lines formed by the alternate sheets of anywhere near sufficient fineness and of uniformity of width. It has been further proposed to weave a pattern of blue, green and red threads. This was unsatisfactory as the threads could not be made sufficiently fine or of sufficient uniformity. It has further been proposed to produce fine threads of celluloid or similar material by suitable spinnerets, dye these threads, cut them up into particles and then press them out on a suitable support to form a multicolored surface. The technical difficulties for effecting this are great and, furthermore, the disposition of the blue, red and green particles cannot be controlled to produce the regularity of adjacent colors which is necessary for the production of good pictures. Furthermore, assuming that this could be done the particles cannot be made sufficiently fine to produce a film suitable for motion pictures, because of the great magnification to which a motion picture is subjected during projection. It has also been proposed to form a line screen by coating one side of a film with some substance dyed in red and then scraping or cutting away portions of this coating to produce red lines. The other side of this support was coated with a substance dyed in green and portions of this substance cut away to produce green lines, the green and red lines alternating. This produced only a two color screen and the technical difficulties of producing such a screen are such as to preclude commercial use.

None of these proposed methods have, as far as I know, gone into practical or commercial use.

The present invention is directed to solving the difficulties enumerated in producing a film of the first class above referred to, and the invention has for its especial object the production of a continuous multicolor screen film having the screen photographically produced thereon from which film positive colored films may be produced which can be projected in the ordinary projecting machines, that is, the same machines now employed to project black and white or monochrome pictures. It is a further object of the invention to provide a method of manufacture whereby the cost of the commercial production of such films is materially reduced as compared with the methods heretofore suggested.

With these and other objects not specifically referred to in view, the invention consists broadly in the production of a multi-color screen film of substantial length having different colored elements arranged for instance in a pattern of lines, dots or figures, the pattern being produced continuously by photographic printing, the pattern being colored in two or more colors and being produced on one side of the film, the color screen thus produced forming of itself the support on which the sensitized emulsion is coated, the emulsion being coated on the pattern side of the film on the colored elements, this film becoming after exposure a multicolored screen from which the positives, which are to be projected, may be made.

The pattern may be produced on the film by photographic printing in various ways and may be of various forms. The pattern is, however, preferably of parallel lines running lengthwise of the film strip, and these lines are produced in what may be termed periods.

Where a two-color screen is to be produced the lines are of equal width, the colors employed being complementary to each other and alternating across the width of the film, such as red and greenish blue, two of these lines constituting a period.

Where a three color screen is to be produced the period is an area made up of one-third green, one-third red and one-third blue, and these periods follow each other in regular sequence across the width of the film. This film with a sensitized surface on the color lined face thereof is suitable for the production of negative and positive pictures in natural colors.

This lined or other pattern is preferably continuously produced on a film strip of substantial length by photographic printing as distinguished from the various mechanical devices for producing a pattern briefly referred to above.

In photographically producing a two-color film having a pattern of parallel lines in alternating complementary colors, a plain strip of celluloid or other transparent flexible support of any desired length and width is coated on one side with a sensitized coating, such as bichromated gelatine, and this strip is printed from a master strip prepared in any suitable manner having alternating opaque and transparent lines so that alternating spaces of the film are acted on by the light and produce lines of soluble and insoluble gelatine. The soluble portions are removed by washing and the insoluble lines are mordanted and dyed with one of the two colors, as red for instance. The film strip is again sensitized with bi-chromated gelatine and printed through the back, so that the portions between the previously colored lines are acted on by the light, the color of the lines first formed protecting the sensitized coating thereon. The film is then washed to remove the soluble portions from the lines first formed, mordanted and dyed with the second color, as greenish blue. The film is then coated with a sensitized emulsion and is ready for exposure, and from this negative film screen positives may be produced, as hereinafter referred to.

In carrying out my invention in its preferred form, however, I produce a colored screen in which the pattern has parallel lines of the three so-called primary colors, red, blue and green. These color lines run alternately across the film in periods, each period including a red, blue and green element. In photographically producing a film of this character, a sub-master or model film by which the printing is effected, is formed with alternating transparent and opaque lines, and in this instance the transparent or printing lines are one-half the width of the opaque lines. This model may be of various forms and employed in various ways, depending on the character of the lines to be produced, as more fully referred to hereinafter. As stated, in the preferred embodiment of the invention, the lines will be parallel and preferably to effect a simple and convenient registration the model will be produced photographically on one side of the celluloid or other film, the opaque areas of the model being removed after the second lines or second element of the pattern has been printed on the other side of the film. This sub-master or model is produced preferably photographically from a master or model on which there are provided printing lines and opaque lines, the printing lines being twice the width of the opaque lines so as to produce the sub-master with the printing lines a half of the width of the opaque lines.

In thus carrying out the invention for producing a three color film, a plain strip of celluloid or other transparent flexible support of any desired length and width which is to form the film is coated on one side with a sensitized coating, such as bichromated gelatine, and this strip is then printed to produce a pattern of alternating transparent and opaque lines, the opaque lines being twice the width of the transparent lines. The opacity of these lines is produced in any suitable manner as by staining with a non actinic dye or a silver salt which will blacken on reduction. These substances are mentioned merely as examples, but any substance which will produce photographic opacity and which does not affect the film may be used.

The film with the model on one side thereof is then coated on the other side with a light sensitive coating as bichromated gelatine and is subjected to a printing operation by an arc, Cooper-Hewitt, or other light of suitable actinic quality directed through the film, a set of lines corresponding to the transparent lines of the model being thus printed on the side of the film opposite to that on which the model has been produced, as above set forth. The film is then washed to remove the unexposed gelatine, the insoluble gelatine being mordanted and dyed with one of the primary colors, as for instance, green. At this stage of the process the film has a set of green lines on one side of the film and a set of alternating transparent and opaque lines on the other side. The film is then re-coated on the side having the green lines with a light sensitive coating, as bichromated gelatine, and a second set of lines is printed on that side. This second group of lines may be printed either in juxtaposition to the green lines already printed, or in one-half the area between or intermediate such printed lines, the opaque lines on the reverse side of the film covering or protecting the green lines already printed, and a portion of the sensitive coating on each side of the printed green lines. This second printing is, as the first, through the film, the side of the film bearing the transparent and opaque lines being nearest the light source. Preferably this second printing is effected by taking advantage of the principle of parallax, that is, with this printing the position of the film and the light source relatively to each other is varied so that during the second printing the light is directed through the film at a different angle from that at which the first printing was made, thereby affecting a different portion of the sensitized surface of the film from that first printed, it being understood that the film is run through a suitable mechanism in the same position in which the first printing was done. This relative movement of the film and the light source is preferably effected by providing means for moving the light source to produce a light beam which will pass through the film at the desired angle, as very accurate results can be thus obtained. The degree of movement of the light with respect to the film depends on whether it is desired to effect the second printing adjacent the first or intermediate of the first printed lines. The second printing having been thus made, the film is washed to remove unexposed gelatine and the insoluble gelatine is mordanted and dyed with the second color, which may be red, washed and dried. By this means a very simple method is provided for registering the second lines in proper relation to the lines first printed.

Where the sub-master or model of transparent and opaque lines is carried on the reverse side of the film, this model is now removed by a buffing wheel dampened with caustic soda, or in any other suitable way. The film after the removal of the model is again coated with a light sensitive coating, as bichromated gelatine and again printed, this third printing taking place in the same manner as that of the first and second, through the back of the film and printing the transparent areas between the previously printed green and red areas. After this third printing the film is again washed to remove unexposed gelatine and the insoluble gelatine is mordanted and dyed with a third color, as blue violet, and dried. This film with the three color screen is then varnished and coated with a sensitive emulsion on the lined side and is ready for exposure to produce a negative. This negative film after exposure is developed, fixed, washed, and dried in the usual manner and positives may then be produced therefrom in various ways as hereinafter referred to.

The lines may, of course, vary in number, but in actual practice in making a three color screen the lines on the negative film are approximately 900 to the inch, that is, 300 approximately of each color.

The invention thus described, may be more fully understood with a detailed description in connection with the annexed drawings which show, as well as can be done in black and white, the various steps above referred to, Figures 1 to 16 inclusive, showing the preferred method of carrying out the invention, Figures 17 to 29 illustrating a modification and Figures 30 to 34 illustrating a two color lined screen and method of producing it.

Figure 1 is a diagrammatic side view, partly in section, of a mechanism by which the various printings referred to may be effected.

Figure 2 is a detail plan view, partly in section, of the printing lamp carrier.

Figure 8 is a diagrammatic showing of the position of the light during the printing of the first line on the sensitized face of the film opposite to the submaster or model carried thereby, the first line being shown as printed, the lines being shown in edge view.

Figures 9 and 10 are respectively edge and face views of the film after the first lines have been printed thereon, Figure 10 being viewed in the direction of the arrow 10 of Figure 9.

Figure 11 is a diagrammatic showing of the position of the light during the printing of the second lines in the sensitized face of the film, the light being shown as shifted to obtain the correct parallax angle, and the second line being shown as printed, the lines being shown in edge view.

Figure 12 is an edge view of the film with the two lines printed thereon in juxtaposition, the sub-master or model having been removed from the film.

Figure 13 is a face view of the film shown in Figure 12 looking in the direction of the arrow 13 of that figure.

Figures 17 to 29 inclusive, show a modification of the method which may, if desired, be employed, two master films which are independent of the film being used in this modified method.

Figure 17:
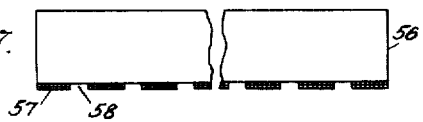

Figure 17 is a broken edge view of the first master or model film from which the first set of lines is printed on the film, the lines in the model being parallel with the length of the film, and alternately opaque and transparent, the opaque lines being twice the width of the transparent lines.

Figure 18:
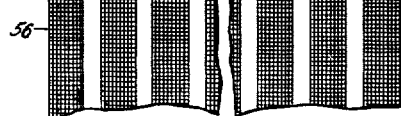

Figure 18 is a broken face view of the master or model film shown in Figure 17.

Figure 19:
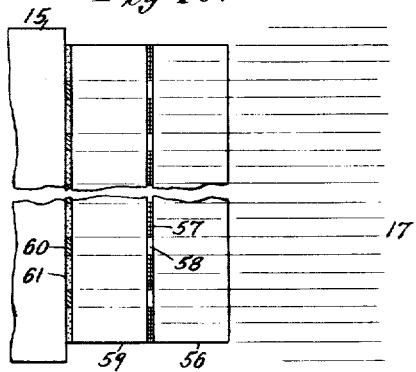

Figure 19 is a broken diagrammatic view showing the printing of the first lines on the film from the master or model shown in Figures 17 and 18, the film being shown as having the first lines printed, the lines being shown in edge view.

Figure 20:
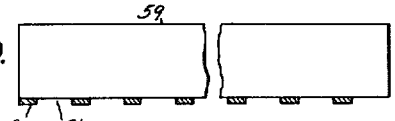

Figure 20 is a broken edge view showing the first line printed on the film.

Figure 21:
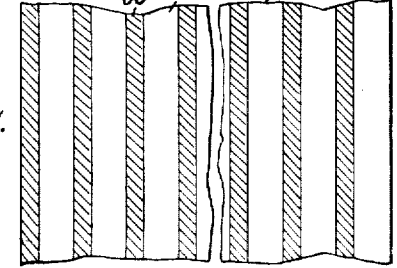

Figure 21 is a broken face view of the same colored green.

Figure 22 is a broken face view of the second master or model employed for printing the second lines, the lines in this master or model being alternately transparent and opaque but of equal width and running at an angle to the length of the film.

Figure 23:
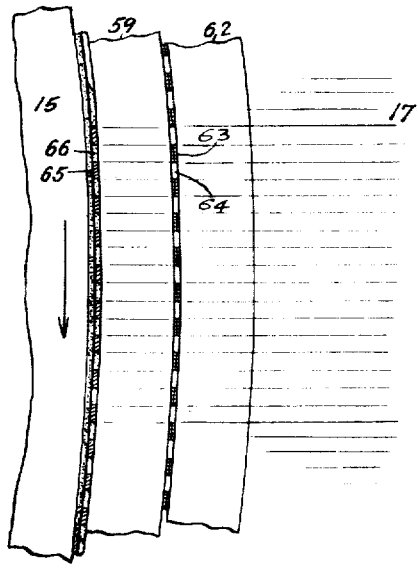

Figure 23 is a diagrammatic broken view showing the printing of the second lines by the second master or model shown in Figure 22, the lines being shown in edge view.

Figure 24:
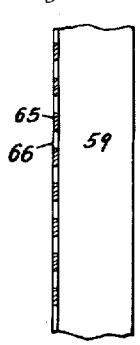
Figure 25:
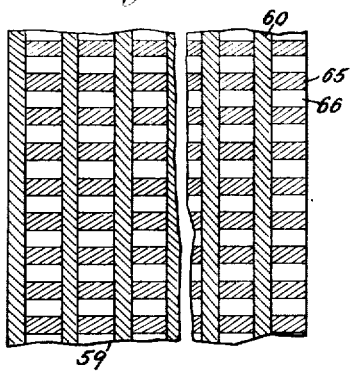

Figures 24 and 25 are respectively broken edge and face views of the film, with the first and second lines printed thereon, the second line being printed at an angle to the first lines.

Figure 26 is a diagrammatic broken view showing the printing of the third lines, the lines being shown in edge view.

Figures 27 and 28 are respectively broken face and edge views of the film with the third lines produced thereon.

Figure 29 is a broken face view of a film with the second and third lines produced thereon in a slanting relation with the first lines.

Figures 30 to 34 inclusive illustrate the production of a two color lined film which may be produced by the apparatus illustrated in Figure 1.

Figure 30:
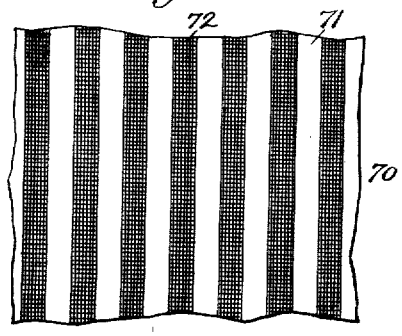

Figure 30 is a broken face view of the master or model film from which the first lines are printed, this master having alternating transparent and opaque lines of equal width, parallel with the length of the film.

Figure 31:
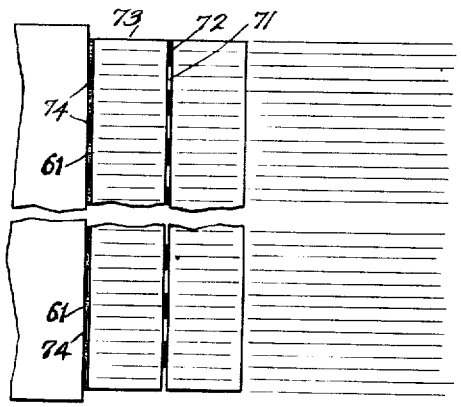

Figure 31 is a broken view showing the printing of the first lines, the lines being shown as printed, and in edge view.

Figure 32:
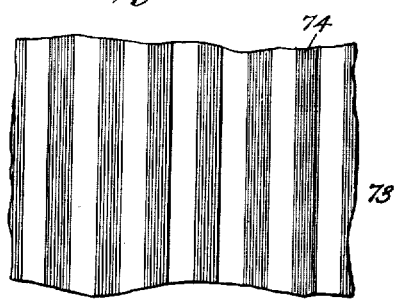

Figure 32 is a broken face view of the film with the first lines printed and colored red.

Figure 33:
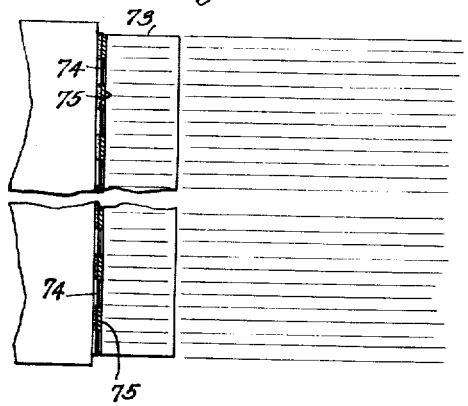

Figure 33 is a broken view showing the printing of the second lines, the lines being shown as printed, and in edge view.

Figure 34:
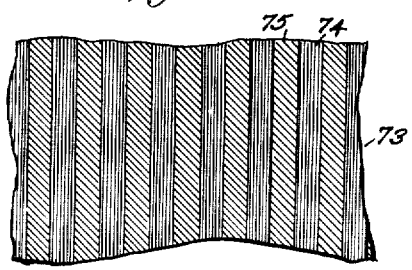

Figure 34 is a broken face view of the film with the two lines printed thereon and colored red and greenish blue.

Figure 6:
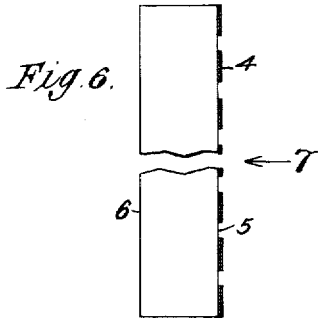
Figures 6 and 7 are edge and face views respectively, of the film after the sub-master or model has been printed on one side thereof, Figure 7 being viewed in the direction of the arrow 7 on Figure 6.
Figure 7:
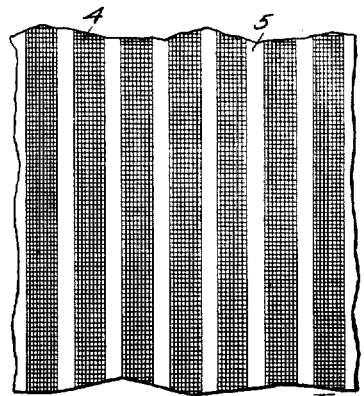

Referring now to these drawings, and first to Figures 1 to 7, inclusive, where the film has the lines produced thereon from a sub-master or model carried on one side of the film itself, I proceed as follows for a three color screen:

A master or model film 1 is employed which has had formed in any suitable manner thereon a series of alternating opaque lines 2 and transparent lines 3, the transparent lines being twice the width of the opaque lines, the lines running in the direction of the length of the film. A plain continuous strip of celluloid or other transparent material which is to form the film of any suitable or desired width within the limits of the master is then coated with a light sensitive coating, as bichromated gelatine and has printed on one side thereof from the master a sub-master or model of opaque lines 4, leaving transparent lines 5, the transparent lines being one-half the width of the opaque lines, this film being indicated by the numeral 6 (see Figs. 6 and 7), it being understood that as shown in Figure 6 the unacted on bichromated gelatin of the lines 5 has been dissolved away in warm water.

This sub-master is printed on the film photographically in any suitable manner, and may be done conveniently in the apparatus illustrated. As shown the film strip is carried on a reel 7 suitably supported on a stud 8. The master model 1 is carried on a reel 9 supported on a stud 10, and if desired may be wound with an apron 11, which as the master is drawn off may be rolled up on a reel 12. The film and the master model are drawn off together over tension rolls 13 by feeding rolls 14 and are passed over a printing drum 15, and against the drum are directed rays of light indicated at 17 from a suitable light source, such as a Cooper-Hewitt light marked 18. During the passage over the drum the opaque lines 4 are printed on one side of the film, the film and the master model leaving the drum over a feeding out roll 19 and passing over a guide 20 and are separated and passed around guide rolls 21 and 22, the film being wound up on a reel 23, and preferably to prevent injury to the lines is wound up with an apron 24 supplied from a reel 25. The master model 1 is wound up on a reel 26 for re-use and preferably to prevent injury is wound with an apron 27 supplied from a reel 28.

Figure 3:
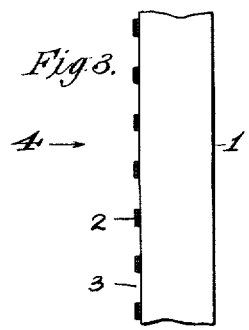
Figure 3 is an edge view on an enlarged scale of the master or model film from which the sub-master model is printed on one side of the film in producing a three color lined film.
Figure 4:
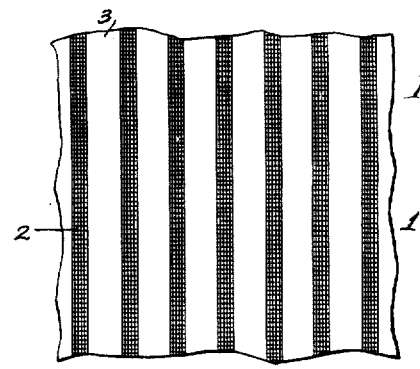
Figure 4 is a face view of the same looking in the direction of the arrow 4 of Figure 3.
Figure 5:
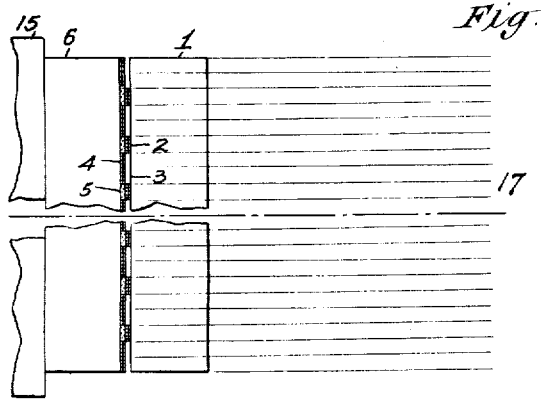
Figure 5 is a diagrammatic showing of the sub-master or model being printed on one side of the film from the master film.

For purposes hereinafter referred to, the light 18 is mounted so that it can be moved to cause the light to be thrown at varying angles relatively to the printing drum 15 over which the films pass. While this may be effected in various ways, the light is supported from brackets 29 secured to a bonnet 30. This bonnet 30 is secured to a bracket 31 which has an extension 32, mounted to slide in a curved track 33, a handle 34 being provided for sliding the extension. Adjustable stops 35 may be provided to limit the sliding movement in either direction and the whole device may be supported from a suitable standard 36. There will preferably be provided a light directing device such as shields 37 on each side of the lamp for directing the light rays, as hereinafter referred to. In producing the sub-master or model on the film, the light may be in central position, as shown in Figures 2 and 5, this effecting an even distribution of light over the surface of the film and providing an even printing. The light and shields will be arranged furthermore so as to throw a light beam parallel with the lines which are to be printed thereby.

The film having had the sub-master or model printed on it, as described, is washed and dried, and is then ready to have the first color element as a line printed on the side opposite the sub-master.

In printing the first lines the roll of film is coated on the side opposite the sub-master or model with some light sensitive substance, as bichromated gelatine, and is then run through the machine above described, being supported on the spindle 8 before referred to, the film being run over the exposure cylinder 15 and being printed as it passes over the cylinder by the light 18 before referred to. The film is led to and wound up on spindle 23, and to prevent injury and to afford a support for the film while it is being washed and dried it is wound up with an apron supplied from spindle 25.

In printing these first lines the light is preferably moved to the position indicated by dotted lines in Figs. 2 and 8, that is to the extent of movement at the upper side of the median line indicated by the letters a, b in the latter figure. The printing is thus effected at an angle and after the printing the film has formed thereon exposed portions 50 and unexposed portions 51 indicated by the stippling 51' in Fig. 8, these latter being twice the width of the former. After exposure the film is washed to remove the soluble unexposed areas 51, is mordanted and then dyed with one of the primary colors, as, for instance, green, washed and dried. The film at this stage of the process is that shown in Fig. 9, having a series of green lines on one side and the sub-master or model on the other, it being understood that the unexposed gelatin has been entirely removed from the areas 51.

The film roll is again sensitized on the side opposite the sub-master with a light sensitive substance as bichromated gelatin and dried, and again inserted in the machine on the spindle 8 and passed over the cylinder 15 to effect the printing of the second lines, which printing is done through the film. It will be understood that this light sensitive coating marked 500 overlies the lines already printed as shown in Figure 11, but when the exposure is made the printed and dyed lines protect this coating and prevent its exposure, so that when the film is again washed, this coating is removed at those points. In the particular embodiment of the method shown these second lines are printed in juxtaposition to the first lines, though it will be understood that under certain circumstances the second lines may be printed intermediate of the lines 50 first printed. To effect the printing of the second lines a relative movement of the light source and film is produced so as to cause the light to pass through the film at an angle different from the angle at which the first printing was effected, whereby a portion of the blank areas 51 left at the first printing will now be unprotected by the opaque spaces of the sub-master or model and a printing of such spaces will be effected. To accomplish this preferably for convenience the light source is shifted to the opposite extreme of the median line a, b, thereby causing the light rays to be thrown against the film at an angle different from the first printing. The amount of the shifting of the light source is such as to cause the light rays to effect a printing of one half of the unprinted portions or areas 51, this printing taking place in juxtaposition to the lines 50 already printed, as is clearly shown in Figs. 11 and 13, the second lines being marked 52, and the remaining spaces unaffected by the light being marked 53. The exposed film with the second lines printed thereon is then washed to remove unexposed soluble gelatin from over the first printed lines 51 and the areas 53, mordanted and dyed with a second primary color, such as red, washed and dried. The film is then subjected either to the action of a buffing wheel or a bath of a weak solution of caustic soda or both to remove the sub-master or model lines 4, and if the film has been subjected to a bath, washed and dried.

Figure 14:
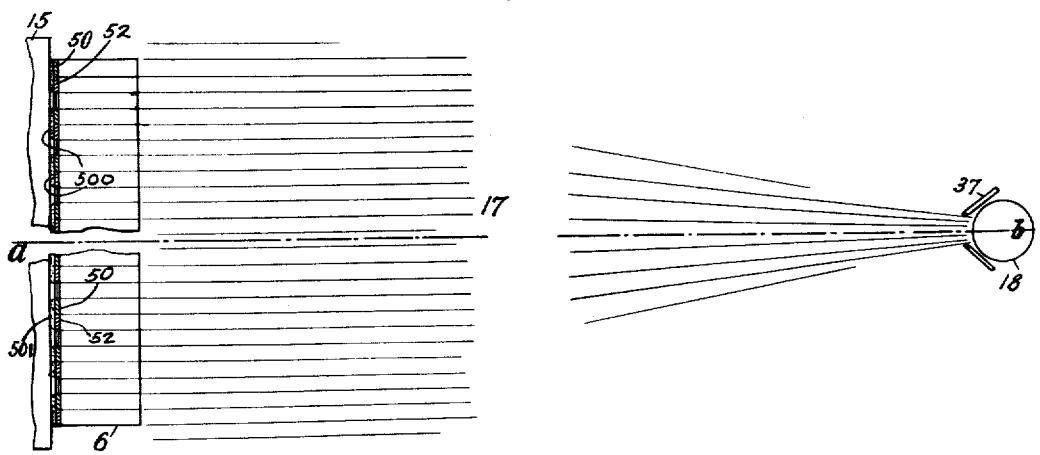
Figure 14 is a diagrammatic view showing the printing of the third line.
Figure 15:
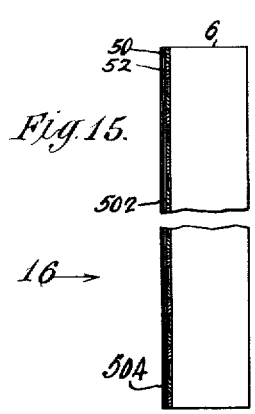
Figures 15 and 16 are respectively edge and face views of the film having the three lines printed thereon in juxtaposition, Figure 16 being viewed from the direction of the arrow 16 of Figure 15.
Figure 16:
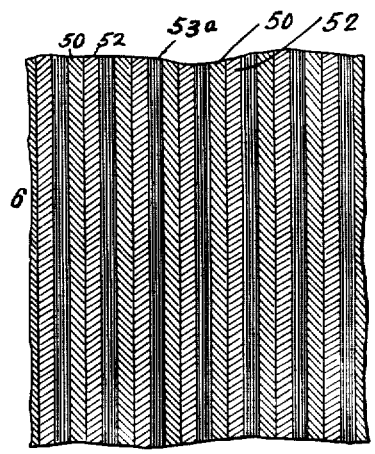

The film at this stage of the process is in the condition shown in Fig. 12, having a plain back, and red and green lines arranged in juxtaposition to each other on the face thereof with a blank space equal in width to one of the lines interposed between two of the printed lines. The rolled film is again sensitized with a light sensitive substance as bichromated gelatin and dried and again passed through the machine supported from the spindle 8 over the cylinder 15 for the third printing through the film. This third coating is marked 501 and covers the two lines already printed and the unprinted areas as indicated in Figure 14. As the red and green lines already printed protect the sensitive coating over them, it is necessary for this third printing only to expose the gelatin coating covering the blank portions 53 left by the second printing, and this is effected as illustrated in Fig. 14, by moving the light rays to a position on the median line $a, b$. After the final printing the film is again washed to remove soluble gelatin, mordanted and dyed with a third primary color, as blue, marked 53$^a$, washed, dried and varnished with any suitable transparent waterproof varnish, such as thin collodion indicated by the line 502 in Fig. 15. The film is then in the condition shown in Figs. 15 and 16. As before stated, the film is made of any desired width up to the limits of the machine and may now be sensitized with any suitable emulsion as a pan-chromatic emulsion indicated by the line 504 in Figure 15, and cut by any suitable cutting and spooling mechanism to the desired width for use.

The film thus produced provides a continuous flexible, sensitive color screen on which a negative may be taken. The colors of the image formed on such negative screen will be complementary to the colors of the object taken and positives in the colors of the object may be produced from these negatives in various ways, one such way being hereinafter referred to. This method of registering the second lines in the production of a parallel lined screen in three or more colors as herein described by the use of the removable model on the face of the support opposite the printed lines is an important feature of the present invention and it may be and is intended to be used in the production of three color lined screen supports for use in making photographs in natural colors as, for instance, a plate of glass, or a sheet of celluloid or the like and such use is within the invention, and the invention as to this feature is not restricted to a continuous length film. The method of thus lining a plate or the like is the same as that just described in the production of a three color lined film and need not be further described.

In Figs. 17 to 29 inclusive, is illustrated a modification in the method of producing a continuous screen film above described.

In the modification shown in these figures the submaster or model, by which the printing of the lines or other pattern on the film is effected, is not carried on the film itself. In this modification there are provided two masters or models for producing these lines. The first of these masters or models, shown in Figs. 17 and 18 and indicated by the numeral 56, is in the form of a continuous strip of film having formed thereon, preferably photographically, alternate opaque and transparent lines 57, 58, the transparent lines being half the width of the opaque lines.

Sensitizing with bichromated gelatin, developing, dyeing and other steps in the treatment of the film described above, are the same in this modification, and need not be again repeated.

This model and the film are run through the machine, as before described, preferably with the light rays parallel with the median line as shown. The first printing of the film produces the structure illustrated in Figs. 20 and 21, in which is shown the film 59 with the green lines 60 thereon, and formed on the face thereof, and the intervening blank spaces 61. The second lines are printed from a second master or model 62, shown in Fig. 22 which is or may be a film strip having photographically formed thereon alternate opaque and transparent lines 63 and 64, these lines in the second model being of equal width and through the lines 63 is printed one half of the area 61 before referred to. These lines are produced during the second printing and the film and the second master or model are superposed and printed through the film so that the lines for the second model and the green lines printed on the film will be at an angle to each other so as to produce the structure shown in Fig. 25, in which red areas 65 are produced between the green lines either at a right angle thereto as shown in Fig. 24 or an obtuse angle thereto as shown in Fig. 29. The blank spaces 66 left in the negative film after the second printing, are then printed through the film to complete it and produce the structure illustrated in Figs. 27 and 29, this third printing filling up the spaces 66 left after the second printing, the red and green areas previously printed, protecting the third sensitive gelatin coating over them.

With this modified method, a film may be produced in which no registration of the lines is required, and in carrying out this modified method, therefore, there is no necessity of shifting the light source. The printing can, therefore, be done on the median line as shown, or at any desired angle.

In Figs. 30 to 34 inclusive, is illustrated the two-color screen film embodying the invention, and briefly referred to above.

In the production of this two-color film a master or model film 70 is employed, this master or model having preferably transparent lines or bands 71, and opaque bands 72 running lengthwise of the film, the transparent and opaque lines being of equal width and the lines being formed on the model preferably photographically. The printing of the lines on the screen film may be effected in the same apparatus and in the same manner as that heretofore described, and the methods of sensitizing with bichromated gelatin, mordanting and dyeing are the same as hereinbefore described and need not, therefore, be repeated. As shown in the figures, the first lines are printed on the film 73, which has been sensitized with bichromated gelatin, through the film and these lines after washing and mordanting are dyed red and produce a structure shown in Fig. 32, the red lines being indicated by the numeral 74. The negative film is again sensitized and again printed through the back thereof so that the previously printed red lines will protect the sensitive substance over it and is washed, mordanted and dyed with a greenish blue color, these greenish blue lines being indicated by the numeral 75 and the structure thus produced is illustrated in Fig. 34.

As so far described, a screen film has been produced which, after sensitizing and exposure, forms a negative of the object photographed in colors complementary to the colors of such object.

Positive picture films in true colors of the object photographed may be obtained from these negative screen films in various ways and on various supports. While the invention has been shown and described in a preferred way of carrying it out, it will be understood that color designs other than lines may be employed for producing the continuous screen film, and that the invention is not to be restricted to this particular pattern or the exact method described for producing this pattern.

What I claim is:

1. The method of producing a film suitable for use in the production of pictures in natural colors which consists in printing photographically on one side of a continuous film strip a design of different elements and coloring the different elements with colors which differ for each element thereby forming a multi-color screen film.

2. The method of producing a film suitable for use in the production of pictures in natural colors which consists in printing photographically on one side of a continuous film strip a recurring pattern of fine elements and coloring the elements of the pattern with colors which differ for each element thereby forming a multi-color screen film.

3. The method of producing a film suitable for use in the production of pictures in natural colors which consists in printing photographically on one side of a continuous film strip a pattern of lines running parallel with the length of the strip and coloring juxtaposed lines with different colors thereby forming a multi-color screen film.

4. The method of producing a film suitable for use in the production of pictures in natural colors which consists in printing photographically one side of a continuous film strip a design of different elements, coloring the different elements with colors which differ for each element to produce a multi-color screen and sensitizing the strip over the colored elements.

5. As a new article of manufacture, a continuous flexible film of long length having produced photographically on one surface a design of different colored elements.

6. As a new article of manufacture, a continuous flexible film of long length having produced photographically on one surface a recurring pattern of fine elements, two adjacent elements being colored in different colors.

7. As a new article of manufacture, a continuous flexible film of long length having produced photographically on one surface a pattern of parallel lines extending in the direction of the length of the film, two adjacent lines being colored in different colors.

8. As a new article of manufacture, a continuous flexible film having produced photographically on one surface a design of different colored elements and a sensitized coating applied over the colored elements.

9. As a new article of manufacture, a continuous flexible film having produced photographically on one surface parallel juxtaposed lines extending in the direction of the length of the film, two adjacent lines being colored in different colors, and a sensitized coating applied over the colored lines.

10. The method of producing a film suitable for use in the production of pictures in natural colors, which consists in printing photographically from a model having alternating transparent and opaque areas one element of a design on one side of a continuous film strip, coloring this element so printed in one color and then printing through the film in the space after the first printing another element of the design and coloring the second element in a different color, thereby forming a multi-color screen film.

11. The method of producing a film suitable for use in the production of pictures in natural colors, which consists in forming on one face of a continuous film strip a removable model having transparent and opaque areas, printing photographically from this model one element of a design on the opposite face of the film, coloring this element so printed in one color, affecting a relative movement of the film and the light source, then printing through the film and model a second element of the design in proper relation to the one first printed, coloring the second element in a different color, and removing the model after the second printing.

12. The method of producing a film suitable for use in the production of pictures in natural colors, which consists in forming a removable model of alternately transparent and opaque lines on one side of a transparent support, photographically printing through the transparent lines of the model a set of lines on the opposite face of the support, coloring these lines in one color, photographically printing a second set of lines on the opposite face of the support in a part of the space left by the first printing, coloring these lines in a different color, removing the model from the support, and printing a third set of lines through the support in the space left by the first two printings, and coloring these lines in a third color.

13. The method of producing a color screen having a pattern of parallel lines for use in color photography, which consists in forming a model of alternate transparent and opaque lines on one side of a transparent support, photographically printing through the transparent lines of the model a set of lines on the opposite face of the support, coloring these lines in one color, effecting a relative movement between the support and the light source to cause the light to pass through the transparent lines of the model at a different angle and then photographically printing a second set of lines on the face of the support opposite the model in a portion of the imprinted area, coloring these lines in a different color from those first printed, removing the model from the support, printing a third set of lines on the support in the unprinted area, and coloring the third set of lines in a third color.

14. The method of producing a film suitable for use in the production of pictures in natural colors which consists in printing photographically from a model having alternating transparent and opaque lines, one series of parallel lines on one side of a continuous film strip, coloring this set of lines in one color, and then printing through the film a second set of lines in juxtaposition to the lines first printed and coloring the second set of lines in a different color thereby forming a multi-color screen film.

15. The method of producing a film suitable for use in the production of pictures in natural colors, which consists in forming on one face of a continuous film strip a removable model having transparent and opaque areas, printing photographically from this model one element of a design on the opposite face of the film, coloring this element so printed in one color, effecting a relative movement of the film and the light source to vary the angle at which the light will pass through the film, printing through the film from the model a second element of the design in desired relation to the one first printed, coloring the second element in a different color, removing the model after the second printing and then printing a third element of the design in desired relation to the two first printed and coloring the third element in a color different from the two elements first printed.

16. The method of producing a film suitable for use in the production of pictures in natural colors, which consists in forming on one face of a continuous film strip a removable model having transparent and opaque areas, printing photographically from this model one element of a design on the opposite face of the film, coloring this element so printed in one color, effecting a relative movement of the film and the light source to vary the angle at which the light will pass through the film, printing through the film from the model a second element of the design in desired relation to the one first printed, coloring the second element in a different color, removing the model after the second printing and then printing a third element of the design in desired relation to the two first printed, coloring the third element in a color different from the two elements first printed and applying a sensitized coating over the colored elements.

17. The method of producing a film suitable for use in the production of pictures in natural colors, which consists in forming on one face of a continuous film strip a removable model having transparent and opaque lines, the opaque lines being twice the width of the transparent lines, printing photographically from this model a series of lines on the opposite face of the film, coloring these lines so printed in one color, effecting a relative movement of the film and the light source to cause the light to pass through the film at a different angle, printing through the film a second series of lines on one half of the area first printed, coloring the second series of lines in a different color from those first printed, removing the model from the film after the second printing and then printing a third series of lines in the area left unprinted by the first and second printings, and coloring the third series of lines in a color different from the second series first printed.

18. The method of producing a film suitable for use in the production of pictures in natural colors, which consists in forming on one face of a continuous film strip a removable model having transparent and opaque lines, the opaque lines being twice the width of the transparent lines, printing photographically from this model a series of lines on the opposite face of the film, coloring these lines so printed in one color, effecting a relative movement of the film and the light source to cause the light to pass through the film at a different angle, printing through the film from the model a second series of lines on one half of the area first printed, coloring the second series of lines in a different color from those first printed, removing the model from the film after the second printing then printing a third series of lines in the area left unprinted by the first and second printing, coloring the third series of lines in a color different from the first and second series and applying a sensitized coating over the colored lines.

19. The method of producing a film suitable for use in the production of pictures in natural colors, which consists in forming on one face of a continuous film strip a removable model having transparent and opaque areas, printing photographically from this model one element of a design on the opposite face of the film, coloring this element so printed in one color, moving the light source relatively to the film to cause the light to pass through the film at a different angle, printing through the film from the model a second element of the design in desired relation to the one first printed, coloring the second element in a different color, removing the model after the second printing, and printing a third element of the design in desired relation to the two first printed and coloring the third element in a color different from the two elements first printed.

20. The method of producing a three color screen having parallel lines, the colors of adjacent lines being different, for use in color photography, which consists in forming a model having transparent and opaque parallel lines, the opaque lines being twice the width of the transparent lines printing photographically a set of lines through the film on the opposite face, coloring this set of lines in one color, printing a second set of lines through the film in juxtaposition to those first printed and covering half of the unprinted area left from the first printing between the lines first printed, coloring this second set of lines in a different color from that of the first set, removing the model from the support, printing a third set of lines through the film covering the area left unprinted by the first and second printings, coloring this third set of lines through the film covering the area left unprinted by the first and second printings, coloring this third set of lines in a different color from that of the first and second sets, and applying a sensitive coating over the surface of the lines.

21. The method of producing a film suitable for use in the production of pictures in natural colors, which consists in sensitizing one face of a continuous film strip, photographically printing on this sensitive surface a removable model having transparent and opaque parallel lines, the opaque lines being twice the width of the transparent lines, sensitizing the opposite face of the film, printing photographically a set of lines from the model through the film on this sensitized opposite face, removing the unexposed areas between the printed lines by washing, mordanting the exposed lines, dyeing the lines in one color, drying the film, resensitizing the film on the face on which the lines have been printed in color, printing a second set of lines through the film in half the area left unprinted by the first printing, washing to remove the unexposed portion of the sensitive surface, mordanting and dyeing the second set of lines in a color different from the first set, drying, removing the model from the reverse side of the film after the second printing, resensitizing the surface of the film on which the lines have been printed, printing a third set of lines through the film in the area left by the first and second printings, washing to remove the unexposed sensitive surface, mordanting and coloring the third set of lines in a color different from the two sets first printed, drying the film and applying a protective coating over the printed lines.

22. The method of producing a film suitable for use in the production of pictures in natural colors, which consists in sensitizing one face of a continuous film strip, photographically printing on this sensitive surface a removable model having transparent and opaque parallel lines, the opaque lines being twice the width of the transparent lines, sensitizing the opposite face of the film, printing photographically a set of lines from the model through the film on this sensitized opposite face, removing the unsensitized opposite face, removing the unexposed areas between the printed lines by washing, mordanting the exposed lines, dyeing the lines in one color, drying the film, resensitizing the film on the face on which the lines have been printed in color, printing a second set of lines through the film in half the area left unprinted by the first printing, washing to remove the unexposed portion of the sensitive surface, mordanting and dyeing the second set of lines in a color different from the first set, drying, removing the model from the reverse side of the film after the second printing, resensitizing the surface of the film on which the lines have been printed, printing a third set of lines through the film in the area left by the first and second printings, washing to remove the unexposed sensitive surface, mordanting and coloring the third set of lines in a color different from the two sets first printed, drying the film, applying a protective coating over the printed lines, and applying a sensitized coating over the protected colored lines.

23. The step in the production of lined screens for use in color photography, which consists in forming a model of alternate opaque and transparent lines on one face of a transparent support and then printing a series of lines from this model through the support on the face thereof opposite the model.

24. The step in the production of lined screen film for use in color photography, which consists in forming a model of alternate transparent and opaque lines on one face of a continuous film strip and then printing a series of lines through the film on the face thereof opposite the model.

25. The method of producing a film of desired length suitable for use in the production of pictures in natural colors which consists in printing photographically on one side of a continuous flexible film a pattern of different elements and coloring certain of the elements with one color, certain of the elements with a second color and certain of the elements with a third color.

26. The method of producing a film of desired length suitable for use in the production of pictures in natural color which consists in printing photographically on one side of a continuous flexible film a pattern of different elements, coloring certain of the elements with one color, certain of the elements with a second color and certain of the elements with a third color, and sensitizing the film over the colored elements.

27. The method of producing a film screen suitable for use in the production of pictures in natural colors which consists in printing photographically on one side of a flexible film of desired length a pattern of three parallel lines and coloring certain of these lines with one color, certain lines with a second color and certain lines with a third color.

28. The method of producing a film screen suitable for use in the production of pictures in natural colors which consists in printing photographically on one side of a flexible film of desired length a pattern of three parallel lines, coloring certain of these lines with one color, certain lines with a second color and certain lines with a third color, and sensitizing the film over the colored lines.

29. As a new article of manufacture, a flexible film of the desired length having produced photographically on one surface a pattern of different elements, certain of the elements being colored in one color, certain of the elements being colored in a second color and certain of the elements being colored in a third color.

30. As a new article of manufacture, a flexible film of the desired length having produced photographically on one surface a pattern of three parallel lines, certain of the lines being colored in one color, certain lines being colored in a second color and certain lines being colored in a third color.

31. As a new article of manufacture, a flexible film of the desired length having produced photographically on one surface a pattern of different elements, certain of the elements being colored in a second color and certain of the elements being colored in a third color, and a sensitized coating applied over the colored elements.

32. As a new article of manufacture, a flexible film of the desired length having produced photographically on one surface a pattern of three parallel lines, certain of the lines being colored in one color, certain lines being colored in a second color and certain lines being colored in a third color, and a sensitized coating applied over the colored lines.

33. As a new article of manufacture, a flexible film of the desired length having produced photographically on one surface a recurring pattern of fine elements, one element of the pattern being colored in one color and the elements on each side thereof being colored in different colors.

34. As a new article of manufacture, a flexible film of desired length having produced photographically on one surface a pattern of three parallel lines, one set of lines being colored in one color and the lines on each side thereof being colored in different colors.

35. As a new article of manufacture, a flexible film of desired length having produced photographically on one surface a pattern of three parallel lines, one set of lines being colored in one color and the lines on each side thereof being colored in different colors, and a sensitized coating applied over the colored lines.

36. In the production of screens for use in color photography the step which consists in forming a model having a recurring pattern of alternate opaque and transparent elements on one side of a transparent support and then printing photographically a series of similar elements from the model through the support on the side thereof opposite the model.

37. The step in the production of film screens for use in color photography which consists in forming a model having a pattern of alternate opaque and transparent elements on one side of a continuous flexible film of the desired length and then printing a series of similar elements from the model through the film on the side thereof opposite the model.

38. As a new article of manufacture a continuous flexible film of long length having produced photographically on one surface a pattern of parallel lines not less than 900 to the inch width-wise of the film, said lines being colored in different colors.

39. As a new article of manufacture a continuous flexible film of long length having produced photographically on one surface a recurring pattern of three parallel lines not less than 900 to the inch width-wise of the film and extending in the direction of the length of the film, two adjacent lines being colored in different colors.

40. The method of producing a film suitable for use in the production of pictures in natural colors, which consists in printing photographically on one side of a continuous film strip a recurring design of three parallel lines not less than 900 to the inch width-wise of the film and coloring the lines with colors which differ for two adjacent lines.

In testimony whereof, I have hereunto set my hand.

JOHN H. POWRIE.